Patented Aug. 28, 1923.

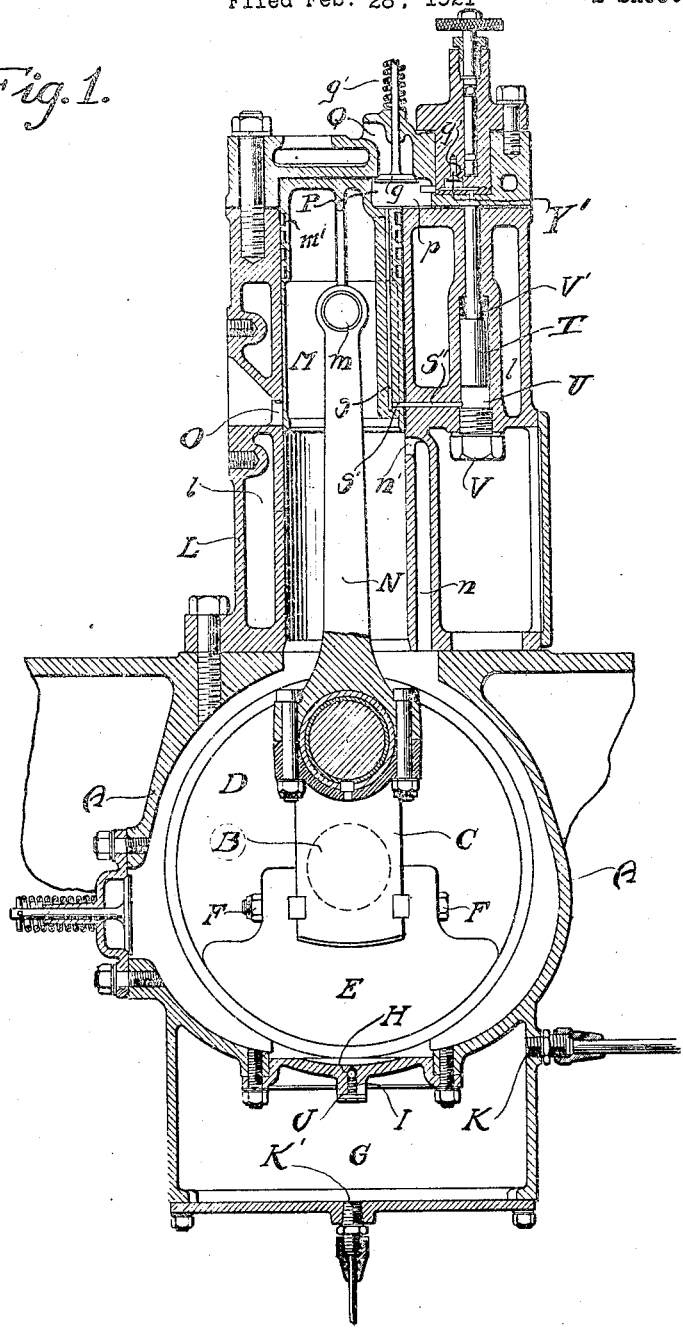

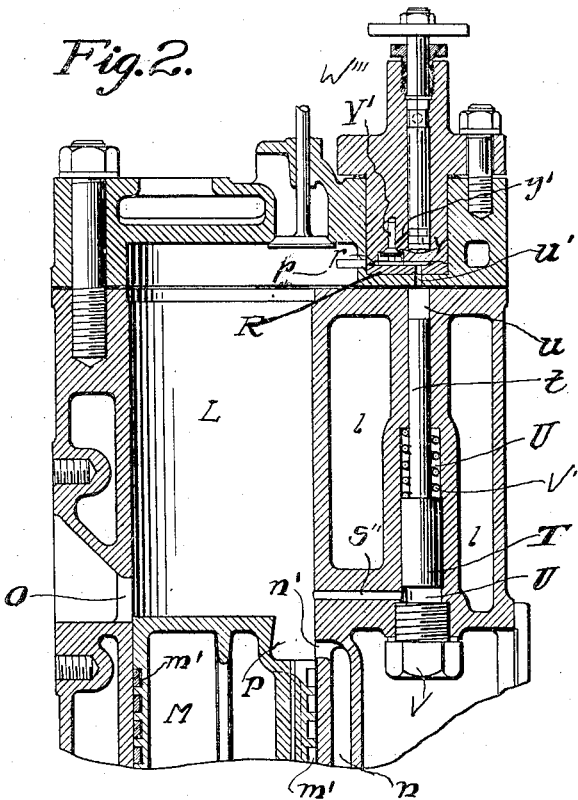
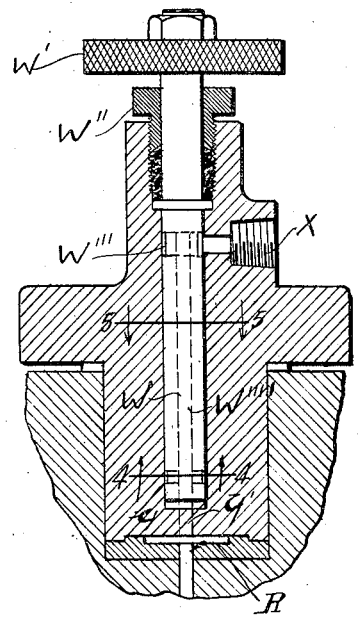
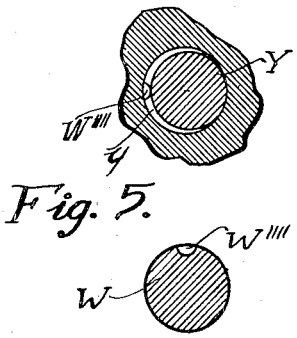
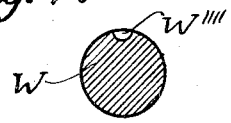

1,466,646

UNITED STATES PATENT OFFICE.

WALDO G. GERNANDT, OF SOUTH BEND, INDIANA.

INTERNAL-COMBUSTION ENGINE.

Application filed February 28, 1921. Serial No. 448,743.

*To all whom it may concern:*

Be it known that I, WALDO G. GERNANDT, a citizen of the United States, and a resident of the city of South Bend, in the county of St. Joseph and State of Indiana, have invented certain new and useful Improvements in Internal-Combustion Engines, of which the following, reference being had to the drawings accompanying and forming a part hereof, is a specification.

This invention relates to internal combustion engines of the high compression type, that is, to engines wherein the rapid compression cycle of the piston or pistons, creates sufficient pressure (and corresponding high temperature) in the combustion chamber or chambers related to said piston or pistons to produce ignition of fuel contents of said chamber or chambers without the presence of a flame, an electric spark, or other igniting devices.

Among the objects of this invention is to obtain an internal combustion high compression engine, of great flexibility, that is, responsive to manipulation designed to vary the speed and power thereof; to obtain an engine of the kind named which is easily cranked or otherwise actuated to start it; to obtain an engine of the kind named which does not require a cam or other valve actuating mechanism; to obtain an engine comprising few movable parts; which is certain in operation, economically constructed and durable. An additional object is to obtain a high compression internal combustion engine adapted to use fuel of low specific gravity, as, say, kerosene, or distillate, and also fuel of high gravity, as gasoline. In order to carry out these objects, recourse is had to the fundamental idea of trapping in a compression chamber a fluid which poorly sustains combustion, such as the products of combustion from the engine cylinder, this idea being disclosed and broadly claimed in my Patent 1,305,894 issued June 3, 1919 and more specifically described and claimed in my Patent 1,305,533 of the same date and still further specifically described and claimed in my Patent 1,359,498 issued November 23, 1920. In my present application I have shown another specific way of accomplishing the general result, and this specific way will be understood by the following description taken in connection with the drawings, wherein—

Fig. 1, in the drawings referred, to, is a vertical section of an engine embodying the invention, with the piston, connecting rod and crank shaft in compression and highest limit of travel position.

Fig. 2 is a like section, on an enlarged scale, of the upper end of the cylinder and piston, with said piston in its exhaust and lowest limit of travel position.

Fig. 3 is a vertical section on a considerably enlarged scale, and at an angle of ninety degrees from the sections illustrated in Figs. 1 and 2, of the fuel supply mechanism.

Fig. 4 is a horizontal section, on line 4—4 of Fig. 3, viewed in the direction indicated by arrows; and Fig. 5 is a section on line 5—5 of Fig. 3, viewed as indicated by arrows.

A reference character applied to designate a given part indicates said part throughout the several figures of the drawings, wherever the same appears.

A represents the crank case: B the crank shaft; C the crank of said shaft, and D the wrist pin of said crank. E represents the counterweight of the crank shaft, and F a bolt to secure said counterweight on crank C. G represents a chamber beneath the crank case A, and H a passage way communicating with said crank case A and chamber G. I represents a ball valve which is yieldingly held up and seated on the lower end of passage way H by spring J thereunder. K represents an air outlet from chamber G, and K' a liquid outlet from said chamber. Outlet K is designed to be in communication with the fuel supply tank of the engine, and to discharge thereinto above the fuel in said tank, in the ordinary way. L represents the water jacketed cylinder of the engine; and $l$ the space between the walls of said cylinder for water to circulate in the operation of the engine. M represents the piston in cylinder L, and N the conncting rod between said piston and wrist pin D. $m$ represents the pin in piston M on which the upper end of connecting rod N is pivotally mounted to attach said upper end to said piston. $m'$, $m'$, represent piston rings. $n$ represents the passage way from crank case A to inlet ports $n'$. O represents the outlet or exhaust ports of the engine. P represents a recess on one side of the head of piston M, and $p$ a corresponding recess at the compression end of cylinder L, arranged to register with recess P when piston M is at or near the end of its compression stroke. Q represents an outlet from recess $p$, and $q$ a valve which is yieldingly held seated by the spring $q'$. When valve $q$ is unseated, against the resiliency of spring $q'$, no compression is obtainable on the compression stroke of piston M in cylinder L. When said valve is closed the piston M produces, on the compression travel thereof, considerable pressure between the head end of piston M and the end of the cylinder L, and in the recesses P, $p$.

R represents a fuel depository and $r$ a restricted passage way communicating with said fuel depository and with recess $p$. S represents a vertical passage way in the wall of piston M, open at its upper end and communicating with horizontal passage way S' at its lower end. S'' represents a horizontal passage way in the wall of cylinder L. Horizontal passage ways S' and S'' are in spaced relation to register when piston M is at or near the end of its compression travel. T, $t$, represent a two diameter plunger; and U, $u$, $u'$ a three diameter cylindrical chamber, in part U, $u$, whereof plunger T, $t$, is longitudinally movable.

The fuel control mechanism comprises the following members and parts. X represents a fuel inlet. W represents a vertical spindle or shaft; W' a manually operable wheel secured rigidly on the upper end of spindle W; W'' a gland to said spindle; W''' an annular groove around said spindle, arranged to register with fuel inlet X; and W'''' a longitudinally extending groove on said spindle extending downward from the annular groove W'''' to space $y$; said space being obtained by the turning of the eccentric Y on spindle W. $y'$ represents a passage way which is in communication, at its upper end, with space $y$, and at its lower end is arranged to discharge on to the valve Y'.

The operation of the fuel control is; liquid fuel, as say kerosene, distillate or gasoline, flowing through inlet X into annular eccentric groove W'''', flows down the longitudinally extending groove W'''' into space $y$, around eccentric Y, and from thence, through passage way $y'$ on to valve Y'; and when said valve is open, into depository R. The quantity of fuel flowing through said passage way $y'$ is determined by the angular position of eccentric Y. When said eccentric is in the position in which it is illustrated in Figs. 2 and 4, the greatest possible flow of fuel through passage way $y'$ occurs, and when said eccentric is in the position resulting from turning spindle W through an angular distance of 180° from said illustrated position the flow of any fuel therethrough is prevented.

It will be understood that after combustion takes place in the engine cylinder, some of the products of combustion are forced through restricted passage $r$ into the fuel depository R and into the compression chamber $u$ above the plunger $t$, which is shortly restored to the position shown in Fig. 2, at about which time the valve Y' opens and fuel is deposited in the depository R. Not all of the products of combustion are scavenged out of the space $p$ so that on the compression stroke while some air may be mixed with these unscavenged gases and the mixture may be forced through the restricted opening $r$, the mixture within the fuel depository and compression chamber is a poor one to sustain combustion so that substantially no burning of fuel in the fuel depository takes place and fuel is rapidly injected into the engine cylinder by a plunger $t$, T ahead of the gaseous mixture which is trapped within the fuel depository and compression chamber.

To start the engine illustrated valve $q$ is opened and the crank shaft revolved. As soon as the inertia of the shaft and its balance wheel is sufficient to carry the piston over compression valve $q$ is seated, and compression in the combustion chamber of the engine, and in recesses P $p$ occurs. V represents a plug arranged to close the lower end of part U of cylindrical chamber U $u$ $u'$.

When the piston M is substantially at the end of its compression travel, the passage way S' registers with passage way S'', and part U of the three diameter cylindrical chamber U, $u$, $u'$, is put into communication with the compression chamber, and recesses P $p$, of the engine; and thereupon the pressure in said compression chamber and in recesses P $p$, is transmitted to underneath part T of the two diameter plunger T $t$. The area of said part T being larger than the area of part $t$, (which subjected to the pressure of air at the same pressure as the fluid in the compression chamber and in part U of cylindrical chamber U, $u$, $u'$), the plunger is forced up, rapidly forcing gas or fluid products of combustion out of part $u$ of said chamber, through part $u'$ thereof; and the fuel contents of depository R are thereby forced through the restricted passage way $r$, into recesses P $p$, and into the air under pressure therein contained, (and consequent high temperature), and ignition occurs. When the piston M travels to exhaust position passage way S'' is uncovered, and the pressure in said chamber underneath part T of plunger T $t$ is released; and thereupon spring V, together with any pressure caused from the fluid products of combustion that may exist in depository R and aperture or parts $u$, $u'$, of chamber U $u$, $u'$, forces said plunger down to its initial position. The speed and work of the engine is controlled by turning hand wheel W", thereby controlling the quantity of fuel which may flow from space $y$ into and down passage way $y'$ and be deposited on the top of valve Y, to be discharged into said depository upon sufficient reduction of pressure over the depository to open the valve.

I claim:

1. In an internal combustion engine provided with a cylinder, and a movable piston in said cylinder, a fuel depository, a restricted passage way communicating with said depository and said cylinder, means to supply fuel to said depository, a plurality diameter cylindrical chamber, the part of smallest diameter communicating with said depository, a plunger of plurality diameters in the portions of said chamber of largest diameters, a communicating passage way between said chamber and said cylinder, and a longitudinally extending passage way in the wall of said piston communicating with a passage way extending to the periphery of said piston, in combination with means to control the supply of fuel to said depository.

2. In an internal combustion engine provided with a cylinder, a movable piston, a fuel depository and a restricted passage way communicating with said depository and said cylinder, the combination of means to discharge fluid into said depository and force the fuel contents thereof through said restricted passage way into said cylinder, said means comprising a plunger and passage ways in spaced relation arranged to register when said piston is at substantially its limit of compression travel, and actuate said plunger.

3. In an internal combustion engine provided with a cylinder, a movable piston, a fuel depository and a restricted passage way communicating with said depository and said cylinder, means to discharge fuel in controlled quantities into said depository, said means comprising a spindle rotatably mounted and provided with an eccentric element, in combination with means to force the fuel contents of said depository through said restricted passage way into said cylinder in timed relation to the limit of compression travel of said piston.

4. In an internal combustion engine, a cylinder, a piston longitudinally movable in said cylinder, a fuel depository, means to controllably discharge fuel into said depository, said means comprising a rotatably mounted spindle provided with an eccentric in spaced relation to a passage way therefrom and controlled thereby, in combination with means to force fluid through said depository and discharge the fuel contents thereof through said restricted passage way and into said cylinder, said means to force fluid comprising a plurality diameter plunger and passage ways in spaced relation arranged to register when said piston is at substantially its limit of compression travel, and to establish communication between said cylinder and underneath said plunger.

5. In a two cycle internal combustion engine, a cylinder, a piston, a fuel depository, a restricted passage way communicating with said depository and with said cylinder, means comprising a rotatably mounted spindle provided with an eccentric, a passage way from said eccentric to said depository, and a valve at the discharge end of said passage way, said eccentric in spaced relation to said passage way and arranged to control the inlet thereto, in combination with means, comprising a plurality diameter plunger and passage ways in spaced relation arranged to admit fluid under pressure in said cylinder to underneath the part of said plunger of larger diameter, to force the fuel contents of said depository through said restricted passage way into said cylinder.

6. In liquid fuel control mechanism a rotatably mounted spindle provided with an annular groove and an eccentric and a communicating passage way for the flow of liquid fuel from said groove to said eccentric, in combination with manually operable means to move said spindle a selective angular distance, and a passage way the inlet whereof is controlled by the angular position of said eccentric.

7. Means to inject liquid fuel into the combustion chamber of a two cycle engine comprising a fuel depository, means to deposit fuel in said depository in pre-determined quantity, and means to move said fuel in said depository into said chamber, said means to move comprising a cylindrical chamber having a plurality of diameters, the smallest thereof communicating with said depository, a longitudinally movable plunger having a plurality of diameters in the larger diameters of said chamber, in combination with passage ways from the largest diameter of said chamber and in the wall of the piston of said engine arranged in spaced relation to establish communication between said combustion chamber, in timed relation to the position of said piston and said plurality diameter chamber.

8. In combination in an engine of the class described, having a combustion cylinder and a movable piston therein, a fuel depository and means for feeding fuel thereto, a compression chamber in communication with said fuel depository, means; comprising a restricted passage from said depository to said cylinder and a plunger in said compression chamber; for trapping a poor combustion supporting mixture in the fuel depository and compression chamber, and passageways in spaced relationship arranged to register when said piston is at substantially its limit of compression travel providing means for actuating said plunger in timed relationship to the engine piston to compress said mixture in the depository and compression chamber and force said mixture together with fuel from the depository into the cylinder.

9. In combination in an engine of the class described, having a combustion cylinder and a movable piston therein, a fuel depository, means for feeding fuel thereto, a compression chamber in continuous communication with said fuel depository, means; comprising a restricted passage from said depository to said cylinder and a plunger in said compression chamber; for trapping fluid products of combustion in the depository and end of the compression chamber adjacent the depository, and passageways in spaced relationship arranged to register when said piston is substantially at its limit of compression travel constituting means by which the bottom of said plunger may be acted on by the compressed fluid in the cylinder to compress said fluid products of combustion and force the same together with fuel from the depository into the cylinder.

10. In combination in an engine of the class described, having a combustion cylinder and a movable piston therein, a fuel depository with means for feeding fuel thereto, a compression chamber in continuous communication with said fuel depository, means; comprising a restricted passage from said depository to said cylinder and a plunger in said compression chamber; for trapping fluid products of combustion in the depository and end of compression chamber adjacent the depository, means including a passageway in said piston and a second passageway leading from the first into said compression chamber below said plunger, said passageways being arranged to register when said piston is substantially at its limit of compression travel to pass compressed air below said plunger for actuating the same to compress said fluid products of combustion and force the same together with fuel from the depository into the cylinder in timed relation to said piston.

11. In combination in an engine of the class described having a combustion cylinder and a movable piston therein, means for feeding fuel to said cylinder including; a fuel depository having a compression chamber of a plurality of diameters with the smallest thereof in continuous communication with said depository and a restricted opening in continuous communication with said cylinder for trapping products of combustion which enter within the depository and compression chamber, said means further consisting of a movable plunger of a plurality of diameters in said chamber with means for yieldingly holding said plunger normally retracted, said means further including passageways in spaced relationship for establishing communication between said chamber and said cylinder in timed relation to the position of said piston for actuating said plunger by the flow of the contents of said cylinder into said chamber below the plunger, to cause the same to compress the fluid products of combustion and force the same together with fuel in the depository into the cylinder.

12. In an engine of the class described, the combination of means, for feeding fuel to an engine cylinder in proper timed relation to its piston comprising; a fuel depository with a compression chamber in continuous but somewhat restricted communication therewith, a plunger housed in said chamber, a restricted passage leading from the fuel depository to said engine cylinder and co-operating with the depository, compression chamber, engine cylinder and piston to trap fluid products of combustion forced within the depository and compression chamber, a fuel passage leading to said depository and a valve controlling said passage at its opening into the depository to deposit fuel in the depository at the proper time, rotary adjustable means for feeding fuel to said passage and means including a passageway through the piston itself for actuating the plunger to compress said fluid products of combustion and force the same with the fuel in the depository into said cylinder.

13. In an engine of the class described, the combination of means, for feeding fuel to an engine cylinder in proper timed relation to its piston comprising; a fuel depository with a compression chamber in continuous communication therewith, a plunger housed in said chamber, a restricted passage leading from the fuel depository to said engine cylinder and, cooperating with the depository, compression chamber, engine cylinder and piston to trap fluid products of combustion forced within the depository and compression chamber, a fuel passage leading to said depository and an automatic valve controlling said passage to deposit the fuel in the depository at the proper time, adjustable means for feeding fuel to said passage and registering means, part thereof being carried by the piston itself, and brought into co-operation by the piston for actuating the plunger to compress said fluid products of combustion and force the same with fuel in the depository into said cylinder.

WALDO G. GERNANDT.

Witnesses:
CHARLES TURNER BROWN,
B. S. BROWN.